April 3, 1951  E. GUINCHARD  2,547,576

CAMERA LENS MOUNT

Filed May 23, 1950

INVENTOR
Eric Guinchard.
BY
ATTORNEY

Patented Apr. 3, 1951

2,547,576

UNITED STATES PATENT OFFICE 2,547,576

CAMERA LENS MOUNT

Eric Guinchard, Yverdon, Switzerland, assignor to Paillard S. A., Sainte-Croix, Vaud, Switzerland, a corporation of Switzerland Application May 23, 1950, Serial No. 163,628
In Switzerland June 15, 1949

7 Claims. (Cl. 88—57)

Lens mounts for cameras and in particular carriers for photographic and kinematographic cameras include generally two parts that may be shifted with reference to one another in order to provide for focussing. Generally, said two parts of the mount are mechanically interconnected through a helical slot or cam-shaped member so that the relative axial position of the two parts may depend on their relative angular position and there corresponds to each of said relative angular positions of the two parts of the mount a predetermined focussing distance for the object to be photographed.

Certain lens mounts for camera include no focussing means. In such mounts, the two parts of the lens remain in unvarying relative locations and their relative positions are selected and defined in the mounting in a manner such that the lens may be focussed for a distance generally termed the hyperfocal distance.

Said hyperfocal distance is generally defined for a fully uncovered lens. For instance, in the case of a kinematographic camera, operating on a 8 mm. film with a lens the focal distance $f$ of which is equal to 12.5 mm. with a maximum opening of 1/2.8, the unvarying focussing distance of the lens without any adjustable focussing means being provided, lies at 2.8 m. Under such conditions, the depth of the field of the lens extends between the infinite and 1.4 m. It will be readily ascertained from said example that the hyperfocal focussing distance that is also termed the "fix-focus" by craftsmen, is of considerable interest when it is desired to obtain a large depth of field. Unfortunately, said distance is generally not defined with sufficient accuracy on the scale of distances of a lens mount provided with an adjustable focussing device.

My invention has for its object a lens mount for cameras that is provided with focussing means for removing the above disclosed drawback; this is obtained through the fact that the mount includes a stop system defining the relative angular position between the two parts of the mount that correspond to a hyperfocal adjustment of the lens for which the depth of field extends between the infinite ends near distance, which latter distance depends for a given lens on the opening of the diaphragm.

I have illustrated diagrammatically and by way of example in accompanying drawings, a preferred embodiment of the lens mount according to my invention. In said drawings.

Figure 1:
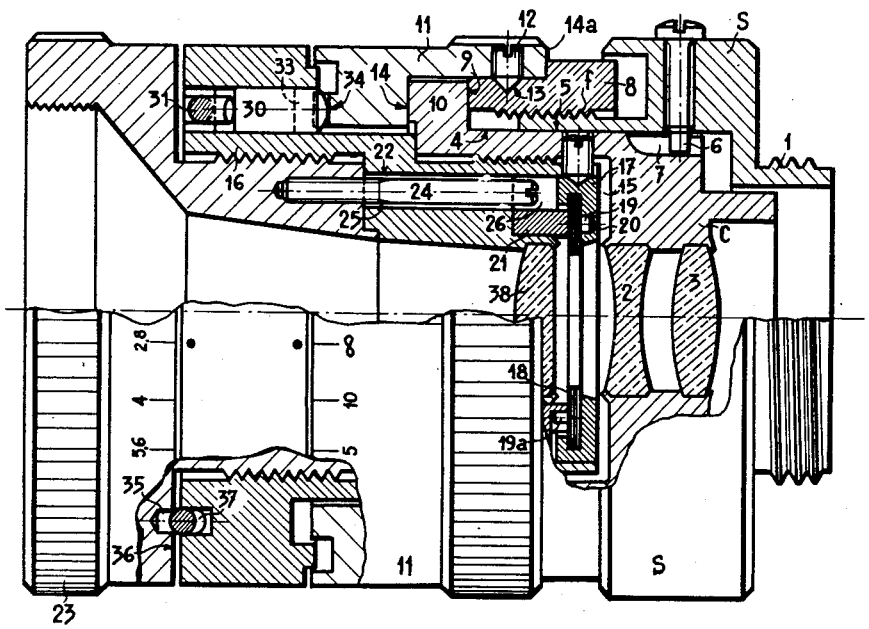
Fig. 1 is a view of a lens mount, parts of which are shown sectionally, and parts of which are shown torn off.
Figure 2:
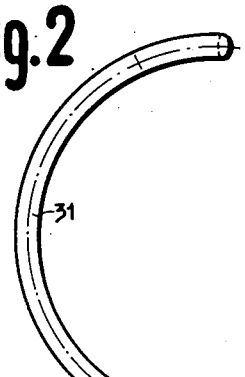
Figs. 2 to 5 are detail views.
Figure 3:
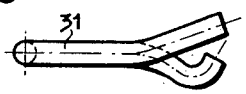

The mount illustrated by way of example in said drawings includes a support S provided with a threaded part 1 adapted to be screwed into a ring not illustrated, rigid with the actual camera body. Said support is provided with an axial bore inside which is fitted a member C carrying two lenses, 2 and 3. Said member C shows a cylindrical guiding surface 4 sliding inside a corresponding surface 5 provided on the carrier S. Lastly, a projection 6 rigid with the support S engages a groove 7 provided in the member C along a generating line of the latter. The support S is also provided with a helical slope constituted by a thread $f$ over which is screwed a tapped ring 8 bearing through its front shoulder 9 against a bearing flange 10 of the member C. The threaded ring 8 carries a control member 11 rigidly secured thereto by means of grub screws 12 the ends of which engage depressions 13 in said ring. Said control member includes a shoulder 14 bearing against the bearing flange 10 on the member C. As illustrated in the drawing, the mounting is provided in a manner such that the fastening of the grub screws 12 urges the ring 8 into a movement towards the shoulder 14a on the control member 11. Further, the bearing flange 10 is fitted without any axial play between the shoulders 14 and 9. Thus a coupling without any angular or axial play is provided for connecting the control member 11, the ring 8 and the member C together. The latter is provided with a chamber 15 the walls of which are tapped to engage a sleeve 16 that carries on its front surface, a diaphragm system provided with a variable and progressive opening of a known type. Said system includes a ring 17 to which are pivotally secured, in a separate manner, the blades 18 of the diaphragm through the agency of studs 19 rigid with the ends of the corresponding blades and engaging a blind opening 20 provided in said ring 17. Furthermore, each diaphragm blade 18 carries at its other end a pin 19a engaging a coresponding port provided in a ring 21, the peripheral cylindrical wall of which bears against the cylindrical wall 22 of an axial bore provided in the sleeve 16. The latter also carries a lens 38 that is rigidly secured thereto.

The outer control member 23 is carried by a thread of a low pitch provided inside the sleeve 16. It carries a pin 24 passing through a port 25 formed in the sleeve 16 and the end of which engages a radial cut 26 in the ring 21.

Thus the camera lens described hereinabove provides, as in the case of conventional lenses through an angular shifting of the control member 11, for a rotation of the threaded ring 8 with reference to the support S and therethrough for an axial shifting of the member C with reference to the support S. Furthermore, an angular shifting of the outer control member 23 provides for a shifting of the pin 24 and for a drive of the ring 21 that assumes the same angular movement which in its turn produces a rotation of the blades 18 round their pivots, so as to open or to close the diaphragm correspondingly.

The mount illustrated incorporates, furthermore, a stop arrangement defining the axial position of the member C with reference to the support S that corresponds to the hyperfocal focussing.

Figure 4:
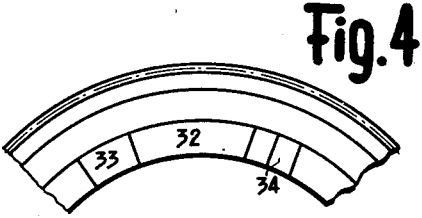
Figure 5:
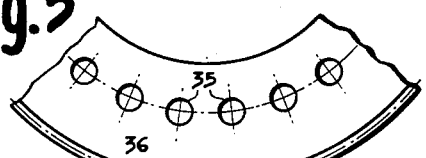

This arrangement includes a piston 30 adapted to slide inside a bore provided in the sleeve 16 and submitted to the action of a spring 31 urging its end into contact with a raceway 32 provided in the front surface of the control member 11. Said raceway assumes the shape of an arc of a circle the ends of which are defined by two walls 33 forming stops and it includes, furthermore, a depression 34 (Fig. 4).

The operation of the stop arrangement is as follows: When the operator actuates the control member 11, the latter executes an angular movement with reference to the sleeve 16 whereby the end of the piston 30 slides over the raceway 32 and engages under the action of the spring 31 the depression 34, when the axial location of the member C with reference to the support S corresponds to the desired hyperfocussing of the lens. Thus the piston 30 cooperating with the depression 34, defines automatically the location of the control member corresponding to the hyperfocal adjustment of the lens. Furthermore, the engagement of the piston 30 with one of the walls 33 defines the location of the control member 11 corresponding to the focussing of the lens onto an object at the infinite distance.

Lastly, the mount illustrated includes also a second positioning means defining the main opening values of the diaphragm. Said means include the end 37 of the above mentioned spring 31 that cooperates with notches 35 provided in a raceway cut in the outer control member 23. Thus, when said member 23 is shifted angularly with reference to the sleeve 16, the end 37 of the spring 31 slides over the raceway 36 and engages in succession the notches 35 so as to define thus various diaphragm openings that have been gauged previously.

From the preceding disclosure and examination of the drawings, it may be ascertained that the lens mount described shows considerable advantages for the operator as it allows in particular adjusting the lens in an accurate manner for the hyperfocal distance without it being necessary for the operator to carefully adjust the angular position of the control member as the latter is defined automatically through the positioning means.

In the embodiment illustrated, the spring 31 assumes the shape of a half circle, one of the ends of which is provided with a projection 37 cooperating with the notches 35 but obviously the members and parts of the positioning means described may be replaced by equivalent members and parts without unduly widening thereby the scope of the invention as defined in accompanying claims.

What I claim is:

1. In a lens mount for cameras, the combination of a support, a lens-carrier slidably carried thereby, a rotary nut shaped member controlling the longitudinal position of the lens-carrier in the support and provided with an annular guideway the plane of which is perpendicular to the axis of the lens-carrier, a cooperating member carried by the lens-carrier and provided with a blind longitudinal perforation registering with the guideway in the rotary member, a piston-shaped member slidingly carried in said perforation, a spring urging the piston-shaped member outwardly into the guideway, the guideway being provided at least at one predetermined point with a depression into which the piston is engaged releasably through the action of the spring for defining a corresponding positioning of the lens-carrier with reference to the rotary member and consequently to the support and a diaphragm carried by the said member provided with a perforation.

2. In a lens mount for cameras, the combination of a support, a lens-carrier slidably carried thereby, a rotary nut-shaped member controlling the longitudinal position of the lens carrier in the support and provided with an annular guideway the plane of which is perpendicular to the axis of the lens-carrier, a cooperating member carried by the lens-carrier and provided with a blind longitudinal perforation registering with the guideway in the rotary member, a piston-shaped member slidingly carried in said perforation, an arcuate blade spring fitted in the guideway to one end of which the piston-shaped member is rigidly secured and adapted to urge the latter outwardly into the guideway, the guideway being provided at least at one predetermined point with a depression into which the piston is engaged releasably through the action of the spring for defining a corresponding positioning of the lens-carrier with reference to the rotary member and consequently to the support and a diaphragm carried by the said member provided with a perforation.

3. In a lens mount for cameras, the combination of a support, a lens-carrier slidably carried thereby, a rotary nut-shaped member controlling the longitudinal position of the lens carrier in the support and provided with an annular guideway the plane of which is perpendicular to the axis of the lens-carrier, the ends of said guideway forming lateral stops, a cooperating member carried by the lens-carrier and provided with a blind longitudinal perforation registering with the guideway in the rotary member, a piston-shaped member slidingly carried in said perforation, a spring urging the piston-shaped member outwardly in the guideway between the stops formed by the ends of the latter, the guideway being provided at least at one predetermined point with a depression into which the piston is engaged releasably through the action of the spring for defining a corresponding positioning of the lens-carrier with reference to the rotary member and consequently to the support and a diaphragm carried by the said member provided with a perforation.

4. In a lens mount for cameras, the combination of a support, a lens-carrier slidably carried thereby, a rotary nut-shaped member controlling the longitudinal position of the lens carrier in the support and provided with an annular guideway the plane of which is perpendicular to the axis of the lens-carrier, a cooperating member carried by the lens-carrier and provided with a blind longitudinal perforation registering with the guideway in the rotary member, a piston-shaped member slidingly carried in said perforation, an arcuate blade spring fitted in the guideway to one end of which the piston-shaped member is rigidly secured and adapted to urge the latter outwardly into the guideway, the guideway being provided at least at one predetermined point with a depression into which the piston is engaged releasably through the action of the spring for defining a corresponding positioning of the lens-carrier with reference to the rotary member and consequently to the support and a diaphragm carried by the said cooperating member provided with a perforation, a rotary control knob for the diaphragm coaxial with the lens-carrier and provided with an arcuate series of notches arranged coaxially with the axis of the lens-carrier, a projection at the other end of the blade spring adapted to engage selectively one of said notches according to the position given to the rotary control knob.

5. In a lens mount for cameras, the combination of a support, a lens carrier slidably carried thereby, a rotary member provided with a tapping coaxial with the lens-carrier and engaging the latter threadedly, said rotary member being longitudinally stationary with reference to the lens-carrier, a sleeve fitted inside the lens-carrier, and including a flange facing the terminal surface of the rotary member, the cooperating surfaces of said flange and rotary member being provided respectively with an annular guideway coaxial with the lens-carrier and with a blind longitudinal perforation registering permanently with said guideway during the relative rotary movements between the sleeve and rotary member, a piston-shaped member slidingly carried in said perforation, a spring urging the piston-shaped member outwardly into the guideway, the guideway being provided at least at one predetermined point with a depression into which the piston is engaged releasably through the action of the spring for defining a corresponding positioning of the lens carrier with reference to the rotary member and consequently to the support and a diaphragm carried by the sleeve.

6. In a lens mount for cameras, the combination of a support, a lens-carrier slidably carried thereby, a rotary member provided with a tapping coaxial with the lens-carrier and engaging the latter threadedly, said rotary member being longitudinally stationary with reference to the lens-carrier, a sleeve fitted inside the lens-carrier and including a flange facing the terminal surface of the rotary member, the cooperating surfaces of said flange and rotary member being provided respectively with an annular guideway coaxial with the lens-carrier and with a blind longitudinal perforation registering permanently with said guideway during the relative rotary movement between the sleeve and rotary member, a piston-shaped member slidingly carried in said perforation, an arcuate blade spring fitted in the guideway one end of which engages the piston-shaped member for urging the latter outwardly into the guideway, the guideway being provided at least one predetermined point with a depression into which the piston is engaged releasably through the action of the spring for defining a corresponding positioning of the lens-carrier with reference to the rotary member and consequently to the support, and a diaphragm carried by the said sleeve.

7. In a lens mount for cameras, the combination of a support, a lens-carrier slidably carried thereby, a rotary member provided with a tapping coaxial with the lens-carrier and engaging the latter threadedly, said rotary member being longitudinally stationary with reference to the lens-carrier, a sleeve fitted inside the lens-carrier and including a flange facing the terminal surface of the rotary member, the cooperating surfaces of said flange and rotary member being provided respectively with an annular guideway coaxial with the lens-carrier and with a blind longitudinal perforation registering permanently with said guideway during the relative rotary movements between the sleeve and rotary member, a piston-shaped member slidingly carried in said perforation, an arcuate blade spring fitted in the guideway one end of which engages the piston-shaped member for urging the latter outwardly into the guideway, the guideway being provided at least at one predetermined point with a depression into which the piston is engaged releasably through the action of the spring for defining a corresponding positioning of the lens-carrier with reference to the rotary member and consequently to the support, a diaphragm carried by the said sleeve, a rotary control knob for the diaphragm coaxial with the lens-carrier fitted inside the sleeve therein and provided with an arcuate series of notches arranged coaxially with the axis of the lens-carrier, a projection at the other end of the blade spring adapted to engage selectively one of said notches according to the position given to the rotary control knob.

ERIC GUINCHARD.

REFERENCES CITED

The following references are of record in the file of this patent:

UNITED STATES PATENTS

| Number | Name | Date |
|---|---|---|
| 1,848,402 | Wollensak | Mar. 8, 1932 |
| 2,026,724 | Wollensak | Jan. 7, 1936 |
| 2,263,024 | Wood | Nov. 18, 1941 |
| 2,315,977 | Mihalyi | Apr. 6, 1943 |
| 2,319,083 | Nowack et al. | May 11, 1943 |